US006333568B1

(12) United States Patent
Bitsche et al.

(10) Patent No.: US 6,333,568 B1
(45) Date of Patent: Dec. 25, 2001

(54) SWITCHING ARRANGEMENT AND PROCESS FOR SWITCHING OFF AN ELECTRIC ENERGY SOURCE OF A VEHICLE

(75) Inventors: Otmar Bitsche, Graz (AT); Robert Streit, Oberwangen (CH)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/377,646

(22) Filed: Aug. 19, 1999

(30) Foreign Application Priority Data

Aug. 19, 1998 (DE) .............................. 198 37 585

(51) Int. Cl.⁷ ...................................... B60L 1/00
(52) U.S. Cl. .................. 307/10.1; 307/121; 307/10.7
(58) Field of Search ................... 307/10.1, 10.6–10.8, 307/119–121; 180/279, 65.8

(56) References Cited

U.S. PATENT DOCUMENTS

| 2,853,627 | * | 9/1958 | Karl .................................. 307/10.7 |
| 3,842,228 | | 10/1974 | Green . |
| 5,510,658 | * | 4/1996 | Nakayama ........................ 307/10.1 |
| 5,565,711 | * | 10/1996 | Hagiwara ......................... 307/10.1 |
| 5,631,796 | * | 5/1997 | Yoshihara et al. ................. 361/79 |
| 5,677,604 | * | 10/1997 | Masaki et al. .................... 361/31 |
| 5,717,310 | * | 2/1998 | Sakai et al. ....................... 320/15 |
| 5,757,150 | * | 5/1998 | Kinoshita et al. ................ 307/10.7 |
| 5,816,358 | * | 10/1998 | Adler et al. ...................... 307/10.1 |
| 5,818,121 | * | 10/1998 | Krappel et al. ................... 307/10.7 |
| 5,818,122 | * | 10/1998 | Miyazawa et al. ............... 307/10.7 |
| 5,990,572 | * | 11/1999 | Yasukuni et al. ................. 307/10.1 |
| 5,998,884 | * | 12/1999 | Kitamine et al. ................. 307/10.1 |
| 6,046,553 | * | 4/2000 | Matsunaga et al. ............... 361/23 |

FOREIGN PATENT DOCUMENTS

| 44 15 794 A1 | 11/1995 | (DE) . |
| 07-059202A | 3/1995 | (JP) . |
| WO 95/01887 | 1/1995 | (WO) . |

* cited by examiner

Primary Examiner—Fritz Fleming
(74) Attorney, Agent, or Firm—Crowell & Moring LLP

(57) ABSTRACT

A switching process and apparatus for switching-off an electric energy supply of a vehicle has two switching elements which are mounted in the proximity of the electric energy source, and couple it to supply electric energy to consuming devices of the vehicle. In the event of a fault, an all-pole switch-off is implemented by opening both switching elements. One of the two switching elements is an operating switch by means of which the electric energy source can be switched off in normal operation. In the case of a vehicle driven by an electric motor in a normal operation the driving current of the electric motor is first controlled downward, and the operating switch is then opened when the driving current is decreased.

11 Claims, 3 Drawing Sheets

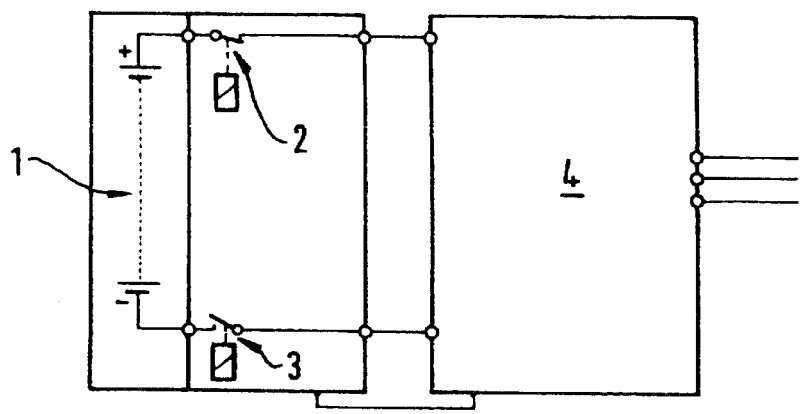
Fig. 1
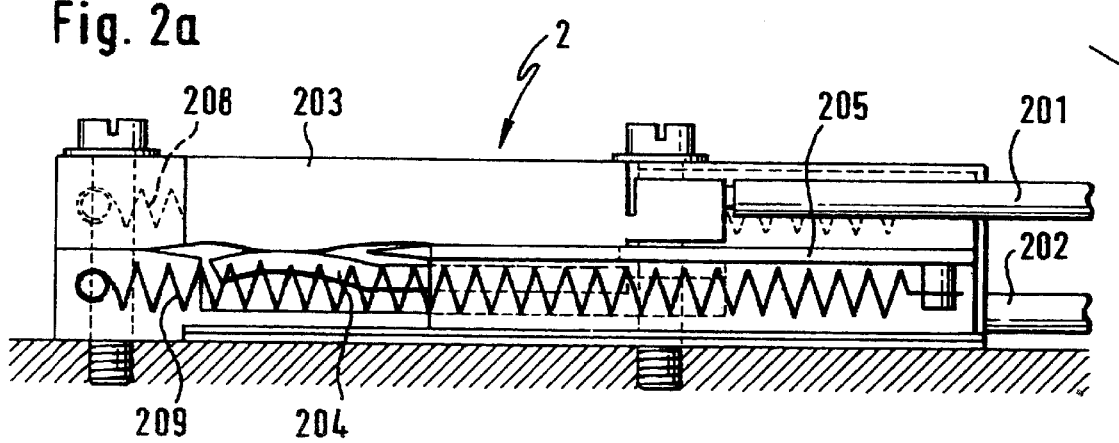
Fig. 2a
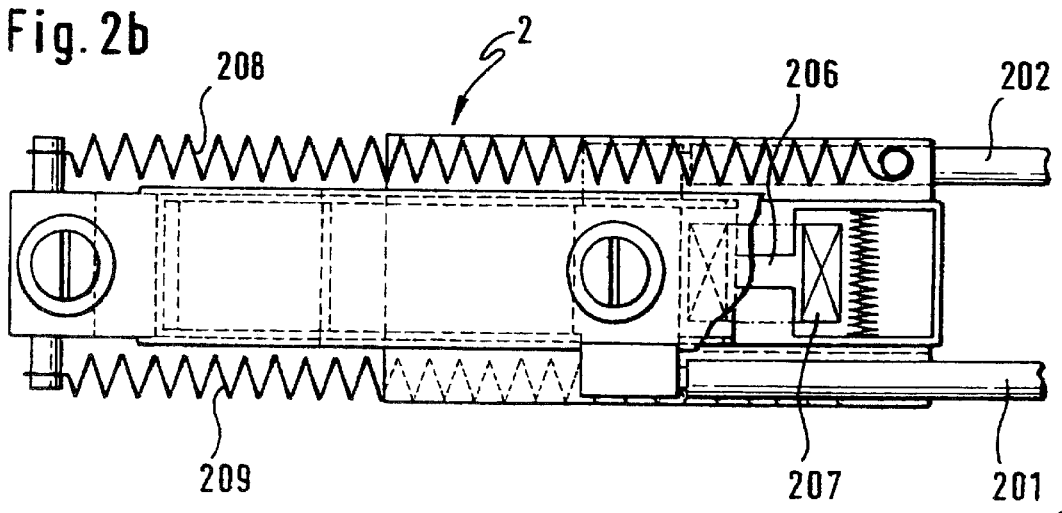
Fig. 2b
Fig. 2

SWITCHING ARRANGEMENT AND PROCESS FOR SWITCHING OFF AN ELECTRIC ENERGY SOURCE OF A VEHICLE

BACKGROUND AND SUMMARY OF THE INVENTION

This application claims the priority of German patent document 19837 585.9, filed Aug. 19, 1999, the disclosure of which is expressly incorporated by reference herein.

The present invention relates to a switching arrangement and to a process for disconnecting an electric energy source of a vehicle, in which two switching elements (through which the consuming devices of the vehicle are supplied with electric energy) are mounted near the electric energy source. In the event of a fault, both switching elements are opened by means of an all-pole switch off.

The switching arrangement according to the invention is particularly applicable to vehicles driven by an electric motor, such as electric and hybrid vehicles having an accumulator (traction battery) or a fuel cell as an electric energy source.

A switching arrangement of this generic type is disclosed, for example, in International Patent Document WO 95/01887, which performs an all-pole separation from an accumulator arrangement and from a generator in the event of a fault (that is, a recognized accident), as well as a switch-off during normal operation.

An all-pole switch-off of this type is also disclosed in Japanese Patent Document JP-A-07059202.

Contrary to these prior art arrangements, it is an object of the present invention to limit the expenditures for components, while maintaining safety-related switch-off functions.

This and other objects and advantages are achieved by the switching arrangement according to the invention, in which one of the two switching elements is used as an operating switch for switching off the electric energy source in normal operation. As a result, only one of the two switching elements needs be designed to perform the switch-off in normal operation (that is, to be operated more frequently, without destroying it in the process). It is thus important that the switching operation via this switching element does not require very high expenditures associated with such more frequent operation. The other switching element, however, will be operated only in the event of an accident or an emergency switch-off, which of course occurs less frequently; therefore, it can be accepted in the case of this switching element that the switching operation itself requires higher expenditures, or possibly that wear occurs because of burning of the electrodes or contacts.

U.S. Pat. No. 3,842,228, discloses a switching element in which a plate made of an electrically non-conducting material is pushed between the two contacts of an electric switch in order to separate the electric contacts, one of which is spring biased. The insertion of the plate separates the latter electric contact from the other contact against the force of the spring. In this manner, a spark discharge which occurs during the separation of the switch contacts (particularly at high electric voltages), is cut off. Thus, this construction of the switching element is also characterized as "extinguishing the spark discharge by a guillotine". The operation of this switching element results in comparatively high expenditures.

One embodiment of the switching arrangement according to the invention incorporates such a switching element, which is suitable for switching large currents (that is, a higher capacity switch), so that it can be used as an emergency cutout switch in the switching arrangement, as explained herein.

For switching large currents, German Patent Document DE 44 15 794 A1 discloses a switching arrangement which is connected in series with the consuming device, as well as a control element for controlling (or automatically controlling) the power consumption of the electric switch. During a switch-off one switch in the switching arrangement is opened only when the load current has been adjusted downward by the control element. Similarly, the latter switch is closed before the current consumption of the consuming device is "driven up" by the control element. As a result, the burden on the switch is relieved in that the currents to be switched thereby are limited.

In such a control element, the design of the operating switch can be correspondingly simple. A contactor can be used whose mechanical loading is limited in the normal operation.

In the above-mentioned embodiment of the switching arrangement according to the invention, the other of the two switching elements forms an emergency cutout switch, in which, during separation of its contacts, an element made of a non-conducting material is pushed between the two contacts. This element can be moved back again so that electric connection of the two contacts can be reestablished. Even though switching by means of this emergency cutout switch requires comparatively high expenditures, it is advantageous (in contrast, for example, to the use of a fusible cutout or a pyrotechnic fuse) that the emergency cutout switch can be reused after a one-time response (that is, an opening), and that it can also trigger when the accumulator arrangement is virtually empty.

This embodiment can safely switch larger currents, which is important particularly in the event of a fault. It will then therefore not be necessary to design both switches for the permanent switching of large currents. A contactor can be provided as the operating switch which, in the event of a fault, is opened, for example, only after the operation of the emergency cutout switch. However, since, on the other hand, the emergency cutout switch is rarely operated, it can be accepted that this switching operation requires slightly higher expenditures.

In another embodiment of the invention, the emergency cutout switch is opened during a switch-off event in normal operation, when the operating current is larger than a first threshold value after a defined first time period $t_1$ following the initiation of the switch-off operation, or when the operating switch does not open at all.

By opening the emergency cutout switch, the accumulator arrangement can be switched off when the operating switch fails to open, or when the downward control of the load current before the switch-off by the operating switch does not work.

The latter two fault events can be recognized by corresponding current measurements. That is, a first current measurement occurs at time $T_1$, and a fault during downward control is recognized if the operating current is then larger than the first threshold value, for example, 20 A. Thereafter, a second current measurement is made after the operating switch has been triggered for the opening, and a fault is recognized if the operating current is larger than 0.

The first threshold value may be in the range of tens of amperes (for example, to 20 A).

In this case, the larger load current is advantageously switched off by the emergency cutout switch after the expiration of the time period $t_1$, if the emergency cutout switch is designed to switch off larger currents, and therefore also to switch off the load current existing in this operating condition.

In another embodiment of the invention, in a vehicle driven by an electric motor in normal operation, the accumulator arrangement is switched off by first controlling the driving current of the electric motor downward, and then opening the operating switch when the driving current has been decreased. As a result, the operating currents which must be switched by the operating switch are advantageously minimized, and the operating switch is subjected to a lower mechanical load (i.e., a lower capacity switch). This is particularly advantageous in the case of the comparatively large operating currents of a vehicle driven by an electric motor.

In yet another embodiment of the invention, both the emergency cutout switch and the operating switch are opened if the operating current exceeds a defined second threshold value, or if a sensor system detects an accident during which the air bag was triggered.

Because of its suitability for switching large currents, it is advantageous to switch the emergency cutout switch earlier than the operating switch. It is also advantageous that, because of the operation of both switching elements, an all-pole separation from the accumulator arrangement is carried out, so that the danger of a fire in the event of an accident is minimized.

The second threshold value is selected to be larger than the first threshold value and, in the case of a vehicle driven by an electric motor, can be in the range of several hundred amperes (for example, to 300 A).

According to another feature of the invention, during a switch-off in normal operation, the operating switch is opened after the expiration of a time period $T_2$ following the initiation of the switch-off operation. The downward control of the load current is designed such that, after the expiration of the time period $t_1$ the load current is smaller than the first threshold value. A current corresponding to this threshold value can be switched by the operating switch without any problem. Thus, by waiting for a time period $t_2$, which is longer than the time period $t_1$, before opening the operating switch in the normal operation, the driving current is lower than the first threshold value. If the downward control is disturbed, after the expiration of the time period $t_1$, the emergency cutout switch is opened if the driving current after the expiration of the time period $t_1$ is larger than the first threshold value. The emergency cutout switch is designed for switching these larger currents. After the emergency cutout switch is opened, the current flow is interrupted so that, when the operating switch is opened up at the point in time $t_2$, current is no longer flowing. Thus, the operating switch is not loaded during the switching operation.

According to still another feature of the invention, in a switch-off during normal operation, the operating switch is opened if the driving current is lower than the second threshold value.

In the case of this embodiment, a driving current is measured, and the operating switch will be opened up at the appropriate time when the driving current has been controlled downward correspondingly far.

In an advantageous further embodiment, it is also possible to store in a control unit information concerning when the emergency cutout switch has opened up or how frequently the emergency cutout switch has opened up. The loading and the wear of the emergency cutout switch can then be stored.

Likewise, information can then be stored concerning how frequently the operating switch has been opened without the driving current being smaller than the first threshold value. As a result, information can also be supplied concerning the loading and the wear of the operating switch.

In the switching process and arrangement according to the invention, it was found to be advantageous that the switching arrangement can be represented at a relatively low price. When the vehicle is assembled, the electric energy source is separated from the remainder of the vehicle with respect to all poles.

Likewise, it is also possible to provide a switching-off by way of both the emergency cutout switch and the operating switch, if an insulation fault has been detected.

A detected fault is advantageously indicated to the vehicle driver, who may then recognize that it is necessary to visit a repair shop.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic diagram of a switching arrangement according to the invention;

FIGS. 2a and 2b are, respectively a lateral view and a top view of an embodiment of an emergency cutout switch.

DETAILED DESCRIPTION OF THE DRAWINGS

Figure 3:
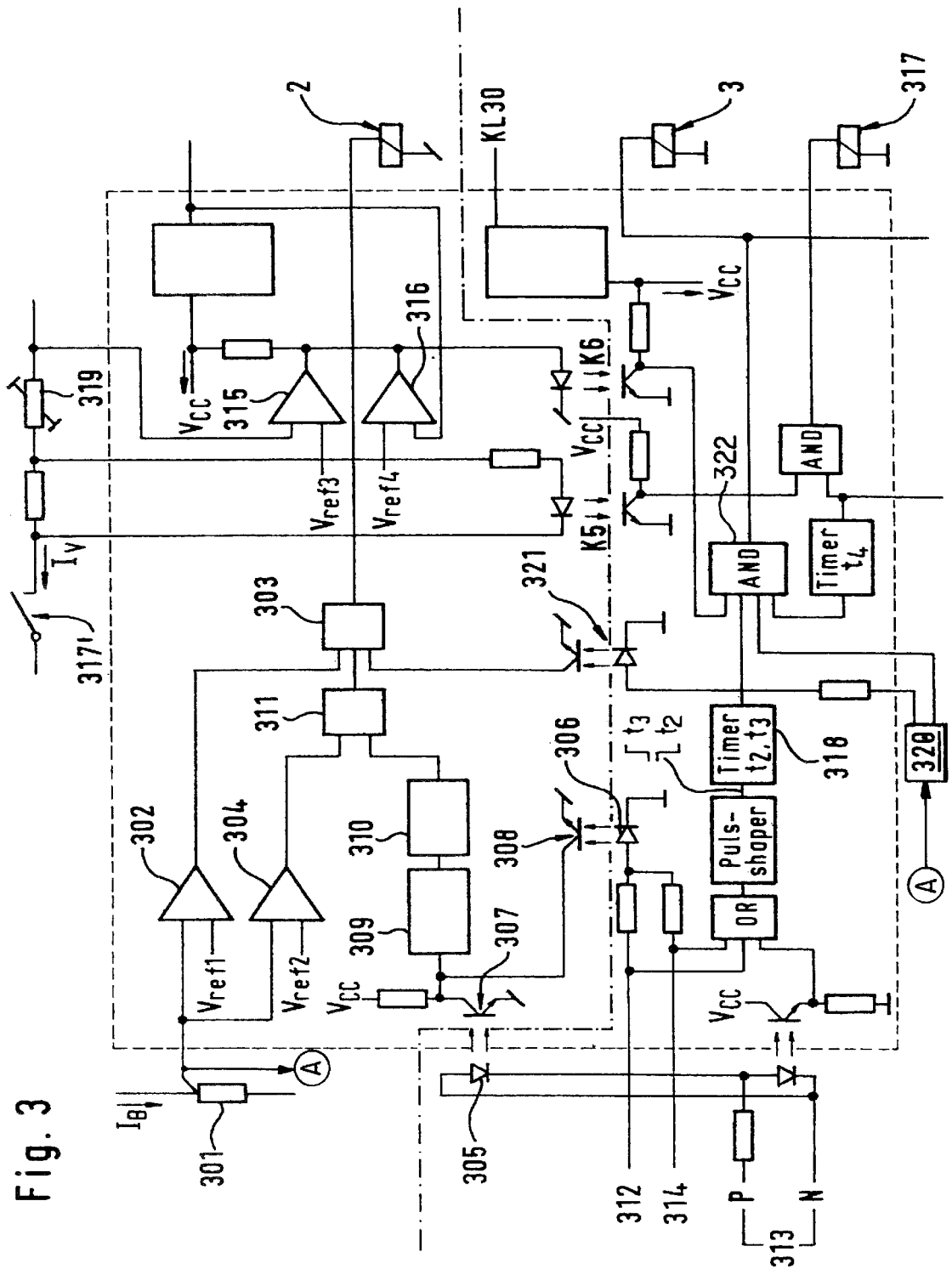
FIG. 3 is a view of an embodiment of a switching arrangement for implementing the invention.

FIG. 1 is a schematic diagram of a switching arrangement according to the invention. An electric energy source 1 is connected by way of two switching elements 2 and 3 with a control or automatic control unit 4, which adjusts the operating current of an electric motor. In the illustration of the switching arrangement according to FIG. 1, the switching element 2 is an emergency cutout switch and the switching element 3 is the operating switch.

FIG. 2 illustrates the further construction details of an embodiment of the emergency cutout switch 2, in a sectional lateral view (FIG. 2a) and a top view (FIG. 2b).

The emergency cutout switch 2 has two connections 201 and 202. Two elements are provided as contact elements 203 and 204, one of which operates as a contact spring, applying spring tension due to its leaf spring configuration in the illustrated embodiment. When the emergency cutout switch 2 is closed, the two contact elements 203 and 204 rest against one another.

When the two contact elements 203 and 204 are to be separated, a plate 205 made of an electrically non-conducting material is pushed between them. Because the contact elements 203 and 204 are separated by the insertion of the plate 205, an electric spark discharge, which may occur during the separation of the contact elements 203 and 204, is immediately extinguished.

The plate 205 made of an electrically non-conducting material is locked in the position illustrated in FIG. 2 by a release bow 206. When the contact elements 203 and 204 of the emergency cutout switch 2 are to be separated, the release bow 206 is moved by the release magnet 207 into a position in which it no longer holds back the plate 205.

Because of the force of the springs 208 and 209, the plate 205 is then moved so that the contact elements 203 and 204 are separated.

FIG. 3 illustrates an embodiment of a switching arrangement for implementing the process according to the invention, in which the drive of an electric vehicle is to be connected and disconnected by means of the switching arrangement according to the invention.

The switching arrangement consists of two completely separate systems, of which the part above the dash-dotted line is applied to the traction potential and is also fed with the traction voltage, while the lower part of the switching arrangement (triggering of the operating switch, which is constructed here as a contactor, as well as of the precharge relay) is applied to the on-board potential and is also fed by the terminal (on-board electrical system, continuous plus).

A shunt resistor 301 is provided to measure the operating current by way of the voltage drop at this resistor.

The comparator 302 and the OR element 303 cooperate to open the emergency cutout switch 2 when the operating current exceeds a defined second threshold value (for example, to 300 A).

The comparator 304 cooperates with the light-emitting diodes 305 and 306 in conjunction with the optical switching elements 307 and 308 (by means of which a pulse shaper 309 and a timer 310 can be started with the time constant $t_1$) to check whether, after a time period $t_1$, the operating current has fallen below a first threshold value (for example to 20 A). For this purpose, the output signals of the timer 310 and the comparator 304 are fed to an AND element 311, whose output, in turn, is fed to the OR element 303. If, after the expiration of the time constant $t_1$, the operating current remains at or above the first threshold value, the emergency cutout switch 2 is opened up.

Furthermore, as shown, a switching-off of switch 2 is also possible by way of the LED/photo detector 321, and a suitably programmed detector unit 320, if the operating switch does not open or if an accident was detected by a known sensor system.

During a switch-on, when voltage is applied to the terminal 15 (312), 230 $V_{ac}$ (313), or during activation of the pilot contact for fast charging (314), the precharge relay 317, 317' and the timer 1 will switch on. As soon as the precharge relay 317, 317' pulls, it holds itself by way of the Otto coupler K5 until the current through the PTC precharge resistor 319 has fallen to a value which the precharge relay 317, 317' can switch off. In order that the operating switch 3, constructed as the main contactor, can pull up, on the one hand the traction voltage behind the precharge relay 317, 317' must have a minimum value and, on the other hand, the voltage drop across the PTC resistor 319 must fall below a defined value, which is implemented by means of the comparators 315 and 316. In FIG. 3, the precharge relay 317, 317' remains continuously pulled in while the operating switch 3 is switched on.

Care must be taken during the switch-off that a reliable and redundant emergency off-function is fulfilled. However, despite the emergency off-function, the emergency cutout switch 2 must not be triggered more often than is necessary. This is achieved by two redundant switch-off systems.

If the 230 $V_{ac}$ network or the fast charging network as well as the terminal 15 (312, 313, 314) are off, the timers 310 and 318 are started by two redundant paths. As a rule, the battery current in the driving current rectifier is lowered within $t_1$ to a value lower than 20 A so that the emergency cutout switch 2 is not triggered. The operating switch 3 will then open no later than after the expiration of $t_2$ ($t_2>t_1$) in timer 318 or, will be switched off by the software in programmed detector 320 even earlier (for example, after the detection of $I_{batt}<20$ A), via AND gate 322, whose output controls the operating switch 3 according to a logical AND function.

If the current rectifier cannot lower the battery current to below 20 A, the emergency cutout switch 2 will trigger after the expiration of $t_1$ and subsequently also the operating switch 3. In this case, the short-circuit current is cut by the emergency cutout switch 2. A conventional software module advantageously signals this case and stores permanently that a separation has taken place, for example, for statistical purposes or for being able to judge the loading of the switch.

If the emergency cutout switch 2 is defective, the operating switch 3 will cut the current after the expiration of $t_2$. The software advantageously signals this case and also stores that a separation has taken place.

Figure 4:
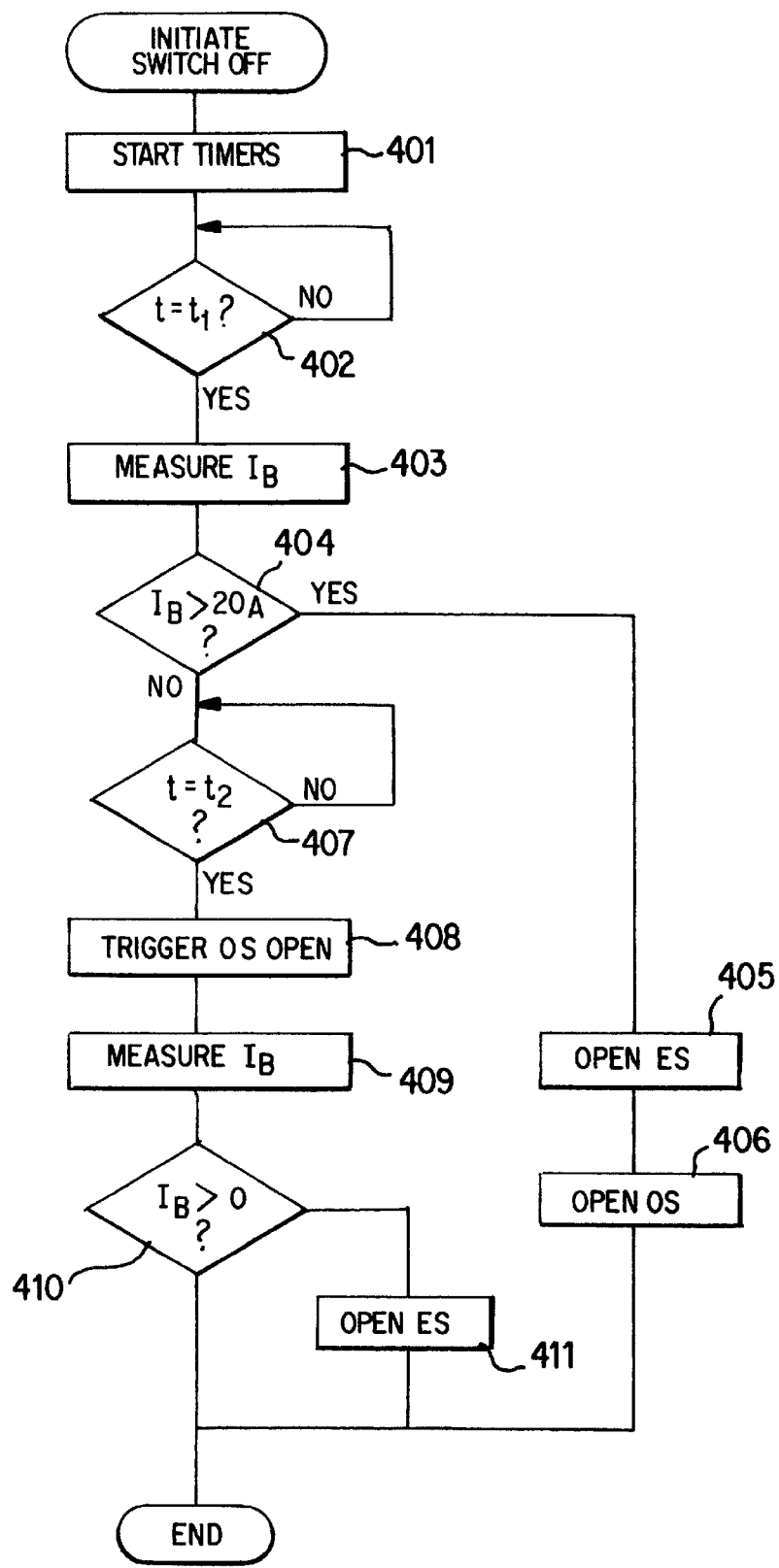
FIG. 4 is a flow diagram which illustrates the operation of the switching arrangement according to the invention.

The foregoing operation of the switching arrangement according to the invention is illustrated in the flow diagram of FIG. 4, in which upon initiation of a switch off operation, measurement of time t is commenced in step 401 (timers 310 and 318 in FIG. 3). At time $t=t_1$ (step 402), the current $I_B$ is measured in step 403, and the determination is made in step 404 whether $I_B$ exceeds 20 amperes. If so, the emergency switch 2 is opened in step 405, and subsequently also the operating switch 3, in step 406, whereupon the process ends.

If, on the other hand, the current $I_B$ is less than 20 amperes in step 404, then a time $t=t_2$ (step 407), opening of the operating switch 3 is triggered in step 408. Thereafter, current $I_B$ is again measured in step 409. If $I_B$ is greater than zero (step 410), indicating that the operating switch has not effectively opened, then the emergency switch 2 is opened in step 411.

If the operating switch 3 is defective, the emergency cutout switch 2 opens up before the operating switch 3 if a current is present which is higher than 20 A. If a current is present which is lower than 20 A, no switch-off takes place a priori by the hardware. In this case, the emergency cutout switch 2 is triggered by the software.

The switching arrangement according to the invention as well as the process according to the invention are suitable of an application in electric cars, but also in other electric vehicles where cost is critical and which have a high safety standard, such as stacker trucks.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Switching arrangement for switching off an energy supply of a vehicle, comprising:
    first and second switching elements mounted in the proximity of the energy supply, and coupling it to supply electric energy to consuming devices of the vehicle, said switching elements being operable to implement an all-pole switch-off of the energy source in the event of a fault, by opening both switching elements; wherein
    the first switching element is a lower capacity operating switch which is operable for switching off the energy supply at relatively lower current conditions in normal operation; and
    the second switching element is a higher capacity emergency cutout switch, which is operable for switching off the energy supply at relatively higher current conditions, and in which, during the separation of electrical contacts thereof, an element made of a non-conducting material is pushed between the contacts.

2. Process for switching off an energy supply having a switching arrangement with first and second switching elements mounted in the proximity of the energy supply, and coupling it to supply electric energy to consuming devices of the vehicle, said switching elements being operable to implement an all-pole switch-off of the energy source in the event of a fault, by opening both switching elements, wherein the first switching element is an operating switch by means of which the energy supply can be switched off in normal operation and the second switching element is an emergency cutout switch, said process comprising:

opening said emergency cutout switch when, during a switch-off event in normal operation, either of the following is true, after a defined first time period $t_1$, following initiation of the switch-off event, operating current from said energy supply is greater than a first threshold value; and when during a switch-off event in the normal operation, the operating switch does not open at all.

3. Process according to claim 2, wherein:

the switching-off occurs in normal operation of a vehicle driven by an electric motor;

the driving current of the electric motor is first lowered; and the operating switch is opened after the driving current has been lowered.

4. Process according to claim 3, wherein both the emergency cutout switch and the operating switch are opened when either: the operating current exceeds a defined second threshold value or an accident is detected by a sensor system during which an air bag in the vehicle was triggered.

5. Process according to claim 3, wherein during a switch-off in normal operation, the operating switch is opened following expiration of a time period $t_2$ after initiation of the switch-off operation.

6. Process according to claim 3, wherein a switch-off in normal operation, the operating switch is opened when the driving current is lower than the first threshold value.

7. Process according to claim 2, wherein both the emergency cutout switch and the operating switch are opened when either: the operating current exceeds a defined second threshold value or an accident is detected by a sensor system during which an air bag in the vehicle was triggered.

8. Process according to claim 7, wherein during a switch-off in normal operation, the operating switch is opened following expiration of a time period $t_2$ after initiation of the switch-off operation.

9. Process according to claim 7, wherein a switch-off in normal operation, the operating switch is opened when the driving current is lower than the first threshold value.

10. Process according to claim 2, wherein during a switch-off in normal operation, the operating switch is opened following expiration of a time period $t_2$ after initiation of the switch-off operation.

11. Process according to claim 2, wherein during a switch-off in normal operation, the operating switch is opened when the driving current is lower than the first threshold value.

* * * * *